(12) United States Patent
Pallini et al.

(10) Patent No.: US 11,713,639 B2
(45) Date of Patent: Aug. 1, 2023

(54) PRESSURE ENERGIZED SEAL WITH GROOVE PROFILE

(71) Applicant: Baker Hughes Oilfield Operations LLC, Houston, TX (US)

(72) Inventors: Joseph W. Pallini, Tomball, TX (US); Baozhi Zhu, Houston, TX (US); Kevin E. O'Dell, Houston, TX (US); Gregory M. Dunn, Houston, TX (US); Luke McElmurry, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 263 days.

(21) Appl. No.: 16/748,249

(22) Filed: Jan. 21, 2020

(65) Prior Publication Data

US 2021/0222508 A1 Jul. 22, 2021

(51) Int. Cl.
*E21B 33/12* (2006.01)
*F16J 15/02* (2006.01)

(52) U.S. Cl.
CPC ......... *E21B 33/1208* (2013.01); *F16J 15/025* (2013.01); *F16J 15/028* (2013.01)

(58) Field of Classification Search
CPC .... F16J 15/028; F16J 15/025; E21B 33/1208; E21B 33/1285
See application file for complete search history.

(56) References Cited

U.S. PATENT DOCUMENTS

| 2,692,066 | A | * | 10/1954 | Conrad | F16J 13/02 220/316 |
| 4,665,979 | A |   | 5/1987 | Boehm, Jr. | |
| 4,742,874 | A |   | 5/1988 | Gullion | |
| 4,949,786 | A | * | 8/1990 | Eckert | E21B 33/04 166/208 |
| 4,949,787 | A |   | 8/1990 | Brammer | |
| 5,067,734 | A | * | 11/1991 | Boehm, Jr. | F16J 15/0881 277/328 |

(Continued)

FOREIGN PATENT DOCUMENTS

| EP | 2239412 | 5/2018 |
| WO | 2016/022293 | 2/2016 |

OTHER PUBLICATIONS

GE Oil & Gas, "VetcoGray subsea wellhead systems," 2009, 12 pages.

(Continued)

*Primary Examiner* — Eugene G Byrd
(74) *Attorney, Agent, or Firm* — Hogan Lovells US LLP

(57) ABSTRACT

A system for forming a seal between wellbore components includes an annular seal arranged between a first wellbore component and a second wellbore component, the seal comprising a first leg and a second leg, wherein upon activation of the seal, the first leg engages the first wellbore component and the second leg engages the second wellbore component. The system also includes an energizing ring adapted to activate the seal. The first wellbore component includes a groove profile, the groove profile having a plurality of grooves including respective first surfaces and second surfaces, the respective first surfaces arranged at respective first angles and the respective second surfaces arranged at respective second angles, the respective first and second angles being different to form respective asymmetrical grooves.

20 Claims, 12 Drawing Sheets

(56) References Cited

U.S. PATENT DOCUMENTS

| | | | | |
|---|---|---|---|---|
| 5,255,746 | A * | 10/1993 | Bridges | E21B 33/043 166/348 |
| 5,285,853 | A * | 2/1994 | Eckert | E21B 33/04 166/382 |
| 5,287,922 | A * | 2/1994 | Bridges | E21B 33/04 166/277 |
| 5,327,965 | A * | 7/1994 | Stephen | E21B 33/04 166/208 |
| 5,725,056 | A * | 3/1998 | Thomson | E21B 33/03 166/208 |
| 5,735,344 | A * | 4/1998 | Duncan | E21B 33/04 166/75.14 |
| 8,127,857 | B2 * | 3/2012 | Sinnott | E21B 33/0422 166/382 |
| 8,312,922 | B2 | 11/2012 | Nelson | |
| 9,057,231 | B2 | 6/2015 | Barnhart | |
| 9,169,711 | B2 | 10/2015 | Raynal | |
| 9,683,421 | B2 | 6/2017 | Gadre | |
| 9,856,710 | B2 * | 1/2018 | Zhu | E21B 33/04 |
| 10,927,637 | B2 * | 2/2021 | Cheng | E21B 33/1208 |
| 2010/0052261 | A1 * | 3/2010 | Maldonado | F16J 15/0881 277/322 |
| 2012/0025470 | A1 * | 2/2012 | Gette | E21B 33/04 277/312 |
| 2012/0043094 | A1 | 2/2012 | Anderson | |
| 2014/0238699 | A1 * | 8/2014 | Gette | E21B 33/04 166/387 |

OTHER PUBLICATIONS

International Search Report and Written Opinion dated Apr. 28, 2021 in corresponding PCT Application No. PCT/US2021/013805.

* cited by examiner

US 11,713,639 B2

PRESSURE ENERGIZED SEAL WITH GROOVE PROFILE

BACKGROUND

1. Field of the Invention

This disclosure relates in general to oil and gas tools, and in particular, to systems and methods for sealing between components in wellbore operations.

2. Description of Related Art

In oil and gas production, different components may be utilized in a downhole environment in order to isolate sections of a wellbore. For example, casing may be installed along an outer circumferential extent of the wellbore and additional equipment, such as hangers and the like, may be installed within the wellbore. The hanger may be used to support wellbore tubulars utilized within the system. In operation, seals (e.g., elastomeric, metal, etc.) may be arranged between the downhole components in order to establish pressure barriers in order to direct fluid into and out of the well along predetermined flow paths. Seals may be "U" shaped and energized via an energizing ring that is driven into the U-opening to generate contact pressure between the seal and the wellbore components. The energizing ring is typically driven into position using setting tools that rely on uphole pressure. Typically, seal integrity declines when subjected to pressure from below (e.g., downhole pressures).

SUMMARY

Applicant recognized the limitations with existing systems herein and conceived and developed embodiments of systems and methods, according to the present disclosure, to improve the systems by utilizing downhole pressure to maintain the seal.

In an embodiment, a system for forming a seal between wellbore components includes an annular seal arranged between a first wellbore component and a second wellbore component, the seal comprising a first leg and a second leg, the first leg positioned proximate the first wellbore component and the second leg positioned proximate the second wellbore component, wherein upon activation of the seal, the first leg engages the first wellbore component and the second leg engages the second wellbore component. The system also includes an energizing ring adapted to activate the seal, the energizing ring extending into an opening of the seal to drive the first leg and the second leg radially outward relative to an axis of the seal. In embodiments, the first wellbore component includes a groove profile, the groove profile having a plurality of grooves including respective first surfaces and second surfaces, the respective first surfaces arranged at respective first angles and the respective second surface arranged at respective second angles, the respective first and second angles being different to form respective asymmetrical grooves.

In an embodiment, a downhole sealing system includes a U-shaped seal having a first leg and a second leg, the first leg being a hanger side leg having a hanger side profile. The hanger side profile includes a bump formed by at least a portion of a peak positioned proximate a pair of troughs, the bump having a first bump surface and a second bump surface, the first bump surface arranged in an uphole direction and the second bump surface arranged in a downhole direction. The downhole sealing system also includes a hanger adapted to be positioned proximate the first leg of the U-shaped seal, the hanger having a hanger profile. The hanger profile includes a groove having a first groove surface and a second groove surface, the first groove surface arranged at a first angle in the downhole direction and the second groove surface arranged the at a second angle in the upstream direction, the first and second angles being different to form an asymmetrical groove.

In an embodiment, a method for forming a downhole seal includes arranging a seal within a wellbore between a first wellbore component and a second wellbore component. The method also includes aligning an energizing ring with an opening of the seal. The method further includes driving the energizing ring into the opening of the seal to deform the seal, the deformation driving a first leg of the seal toward the first wellbore component and a second leg of the seal toward the second wellbore component. The method also includes engaging an asymmetrical groove formed in the first wellbore component via a profile of the first leg.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
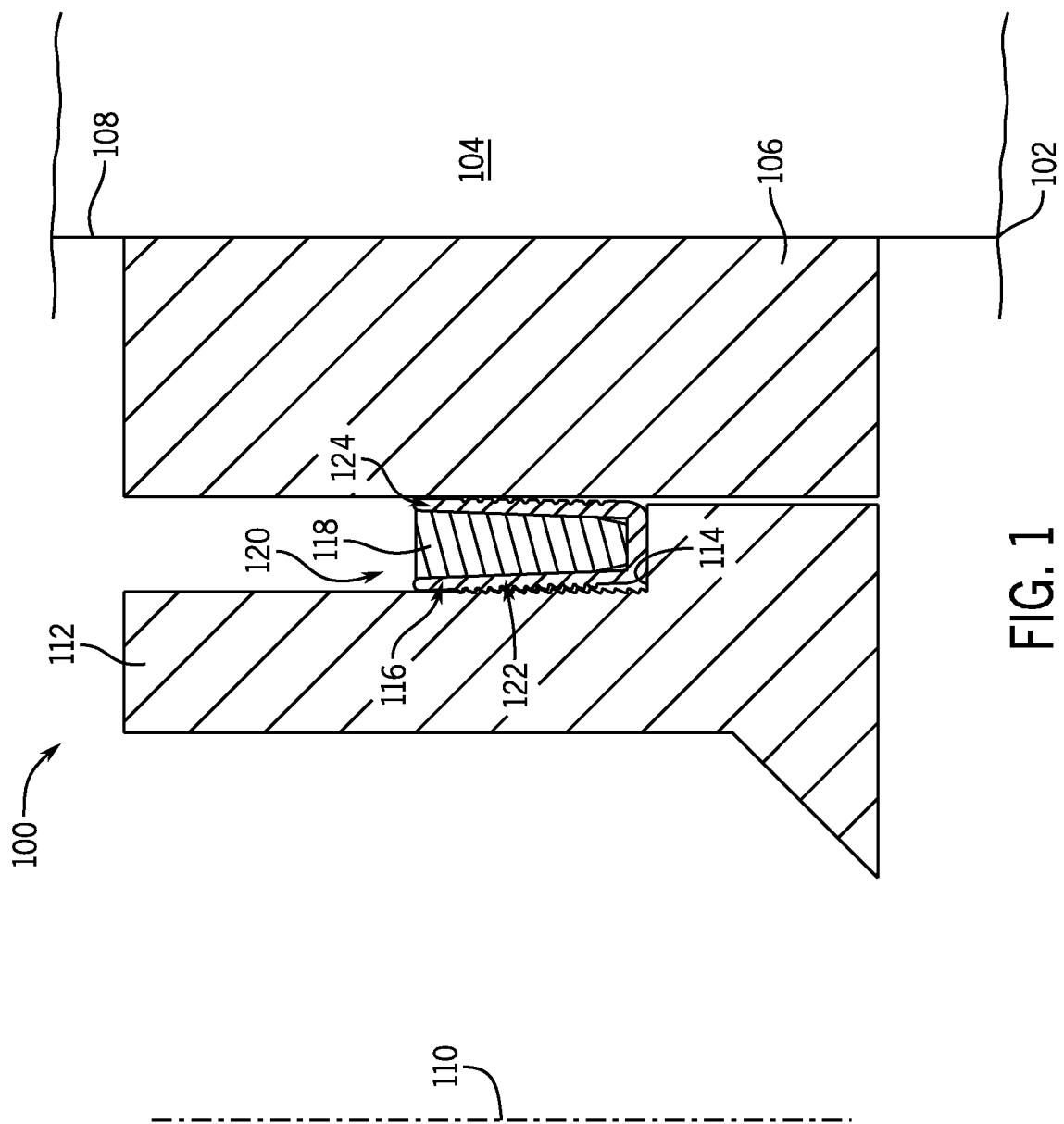
FIG. 1 is a cross-sectional side view of an embodiment of an energizing ring within a seal opening, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed toward pressure energized metal-to-metal seals between wellbore members. In various embodiments, a pressure energization feature may be activated when subjected to pressure from both above (e.g., uphole) and below (e.g., downhole) directions. Various embodiments include a groove profile with asymmetrical angles and an associated seal profile that includes bumps or ridges (which may form a portion of a second groove profile) that contact the groove profile. For example, in embodiments, the seal bumps may climb or otherwise move along a shallow angle of the groove profile to enhance contact pressures when subjected to a downhole pressure (e.g., a pressure applied to a lower portion of the seal). Furthermore, in various embodiments, the grooves lock the seal bumps in place for robust sealing performance.

Downhole sealing systems may be utilized to meet predetermined expected pressure requirements. Typically, as requirements increase, seals are designed with increased interference and crushing, which may put higher demand on material strength and tool capacity. In other words, higher setting pressures may be utilized to deform the seals, which are now formed from stronger materials. However, the increased material costs and setting pressures may be undesirable in the industry. Moreover, excessive deflections may result in larger sectional thicknesses, which are also undesirable. Accordingly, embodiments of the present disclosure are directed toward systems and methods that use during situations where upward motion of seal components arise due to pressure from below (e.g., downhole pressures). Combining the upward motion with an asymmetrical groove angle may translate the up lifting force into a force in a direction that is normal to the seal contacts, which in return further enhances contact and creates robust sealing performance.

Embodiments of the present disclosure may also be directed toward overcoming problems traditionally associated with downhole sealing systems. For example, typical wellbore annulus sealing contact engagement decline when subjected to pressure from below. The nature of the annulus pressure collapses the inner member and enlarges the outer member, thereby increasing annulus area. As a result, annulus seals are typically limited by pressure from below. The increasing pressure requirements in the high pressure high temperature (HPHT) environments have been challenging to meet for most wellbore seal products. However, embodiments of the present disclosure utilize a pressure energizing mechanism when subject to pressure from both above and below, overcoming deficiencies of the present systems.

Embodiments may include a sealing system that includes a seal, which may be a U-shaped seal, that engages a hanger and a housing. The housing may include a housing groove profile that includes peaks and valleys having upstream and downstream edges. The peaks and valleys may be asymmetrical (e.g., an angle of the upstream edge is different from an angle of the downstream edge). Accordingly, when the seal is subjected to forces from difference directions, such as uphole and/or downhole pressures, the seal will engage the upstream and downstream edges and at a portion of the force will be translated to a radial force, which may increase contract pressures between the hanger and the seal, thereby improving sealing performances. In various embodiments, the U-shaped seal may include a second grooved profile, which may also be referred to as bumps or extensions representative of the peaks and valleys of the grooved profile, which is particularly selected to engage the hanger groove profile. In embodiments, the second grooved profile is locked or otherwise fixed to a particularly selected portion of the housing groove profile. In other embodiments, the second grooved profile may travel or move along the housing groove profile. Accordingly, spring back after the seal is set may be accounted for. In other embodiments, substantially matching groove profiles may be arranged along one or both of the housing and hanger side of the seal. Moreover, in embodiments, groove profiles may also be formed on the housing.

FIG. 1 is a cross-sectional side view of an embodiment of a wellbore sealing system 100 arranged within a borehole 102 extending into a downhole formation 104. It should be appreciated that, for clarity with the discussion herein, various components of a well site that may include the borehole 102 have been eliminated. For example, the well site may include surface equipment, such as drilling rigs, wellhead components, and the like. In the illustrated embodiment, a housing 106 is arranged against a borehole wall 108 and radially outward with respect to a borehole axis 110. It should be appreciated that the borehole 102, housing 106, and various other components may be annular components that extend about the borehole axis 110. Furthermore, in various embodiments, the housing 106 may be a casing that is cemented to the borehole wall 108. Additionally, in embodiments, the hanger 112 may be arranged at an uphole location, for example within a wellhead, and may include one or more test ports that may extend into the space between the hanger 112 and the housing 106 to test the integrity of the seal, among other things.

In the illustrated embodiment, a hanger 112 is arranged radially inward from the housing 106 and includes a shoulder 114 that receives the wellbore sealing system 100. The illustrated hanger 112 may receive one or more wellbore tubulars that are suspended into the borehole 102, for example, to recover hydrocarbons. The wellbore sealing system 100 illustrated in FIG. 1 includes a seal 116 that is a U-shaped cup. In operation, the seal 116 receives an energizing ring 118 within an opening 120 that drives a first leg 122 and a second leg 124 of the seal 116 radially away from an axis 126 of the seal 116, such that a seal is formed between the hanger 112 and the housing 106. In various embodiments, the seal 116 is formed from an elastomer, metal, composite material, or the like. However, for clarity with the present discussion, the seal 116 will be described as a metallic seal that forms a metal-to-metal seal between the hanger 112 and the housing 106. As noted above, other components, such as lock rings and the like, have been removed for clarity.

Figure 2:
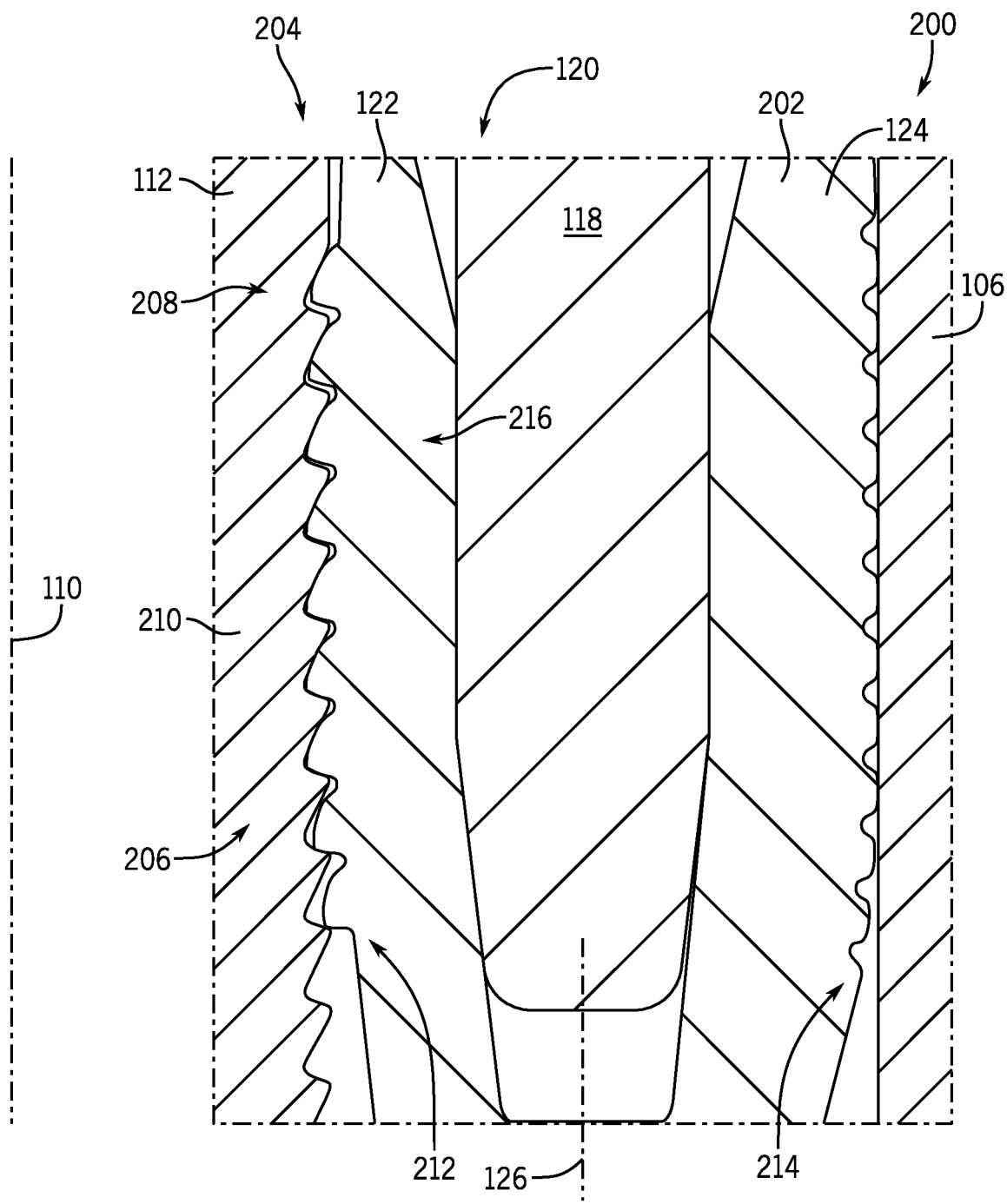
FIG. 2 is a cross-sectional side view of an embodiment of an energized seal arranged in a wellbore, in accordance with embodiments of the present disclosure.

FIG. 2 is a cross-sectional view of an embodiment of a wellbore sealing system 200. It should be appreciated throughout that like reference numerals may be used for like components, but such numbering is for convenience and clarity only, is not intended to limit the scope of the present disclosure. The illustrated wellbore sealing system 200 includes the primary seal 202, which is illustrated as a U-shaped or U-cup seal, arranged between the hanger 112 and the housing 106. The illustrated seal 202 may be referred to as being in an energizing position due to the energizing ring 118 extending through the opening 120. As described, the energizing ring 118 drives the first leg 122 and the second leg 124 radially away from the seal axis 126. Radially away is different for each leg, as radial movement toward the borehole axis 110 (e.g., toward the hanger 112) is radially away for the first leg 122 and radial movement away outward from the borehole axis 110 (e.g., toward the housing 106) is radially away for the second leg 124. As will be described below, the sealing system 200 includes a pressure energizing mechanism 204, which may include features of both the seal 202 and the hanger 112, among other components.

In the illustrated embodiment, the hanger 112 includes a hanger profile 206, which may also be referred to as a groove profile. The hanger profile 206 includes a series of grooves 208 or indentations formed into a body 210 of the hanger 112, with the grooves 208 extending radially inward toward the borehole axis 110. In other words, the grooves 208 may be described as a series of peaks and valleys or troughs. As will be described, the grooves 208 may be asymmetrical such that respective top faces (e.g, uphole faces, upstream faces) of the grooves 208 are arranged at a different angle than respective bottom faces (e.g., downhole faces, downstream faces) of the grooves 208. In embodiments, a housing wall may be substantially smooth, substantially straight, substantially without bumps, and or substantially without indentations. However, in other embodiments, the housing wall may include similar features as the hanger 112. For clarity with the discussion herein, the features are described with respect to the hanger 112.

The primary seal 202 includes a hanger side profile 212 and a housing side profile 214. It should be appreciated that the hanger side profile 212 may be different from the housing side profile 214. Additionally, in embodiments, the hanger side profile 212 and the housing side profile 214 may be substantially the same. Moreover, in embodiments, one of the hanger side profile 212 or the housing side profile 214 may be eliminated. In other words, the hanger side profile 212 or the housing side profile 214 may be substantially planar or smooth. The illustrated housing side profile 212 includes a plurality of bumps or features 216 that extend radially outward from the seal axis 126. The bumps or features 216 may also be referred to as hanger side profile grooves that include peaks and troughs, as described above. The illustrated bumps 216, as will be described below, have an asymmetrical shape in the illustrated embodiment, which may facilitate mating with and operation with the hanger profile 206. However, it should be noted that the bumps 216 may include a variety of different shapes and orientations, as will be described below.

In various embodiments, the legs 122, 124 are energized via the energizing ring 118 to thereby drive the legs 122, 124 radially away from the seal axis 126. The hanger side profile 212 may be moved into contact with the hanger profile 206 such that the grooves 208 and the bumps 216 interact. The interaction may facilitate a force transfer such that an upward force applied to the seal 202 is transferred, at least in part, to the hanger 112. Due to the asymmetrical orientation of the grooves 208, the force may be applied to an upwardly sloped angle, which may translate at least a portion of the force into a force component that is substantially normal to a contact point between the grooves 208 and the bumps 216. As a result, the upward force, rather than collapsing the seal, may provide an improved seal force, as known as the contact force between the seal 202 and the hanger 112.

Figure 3:
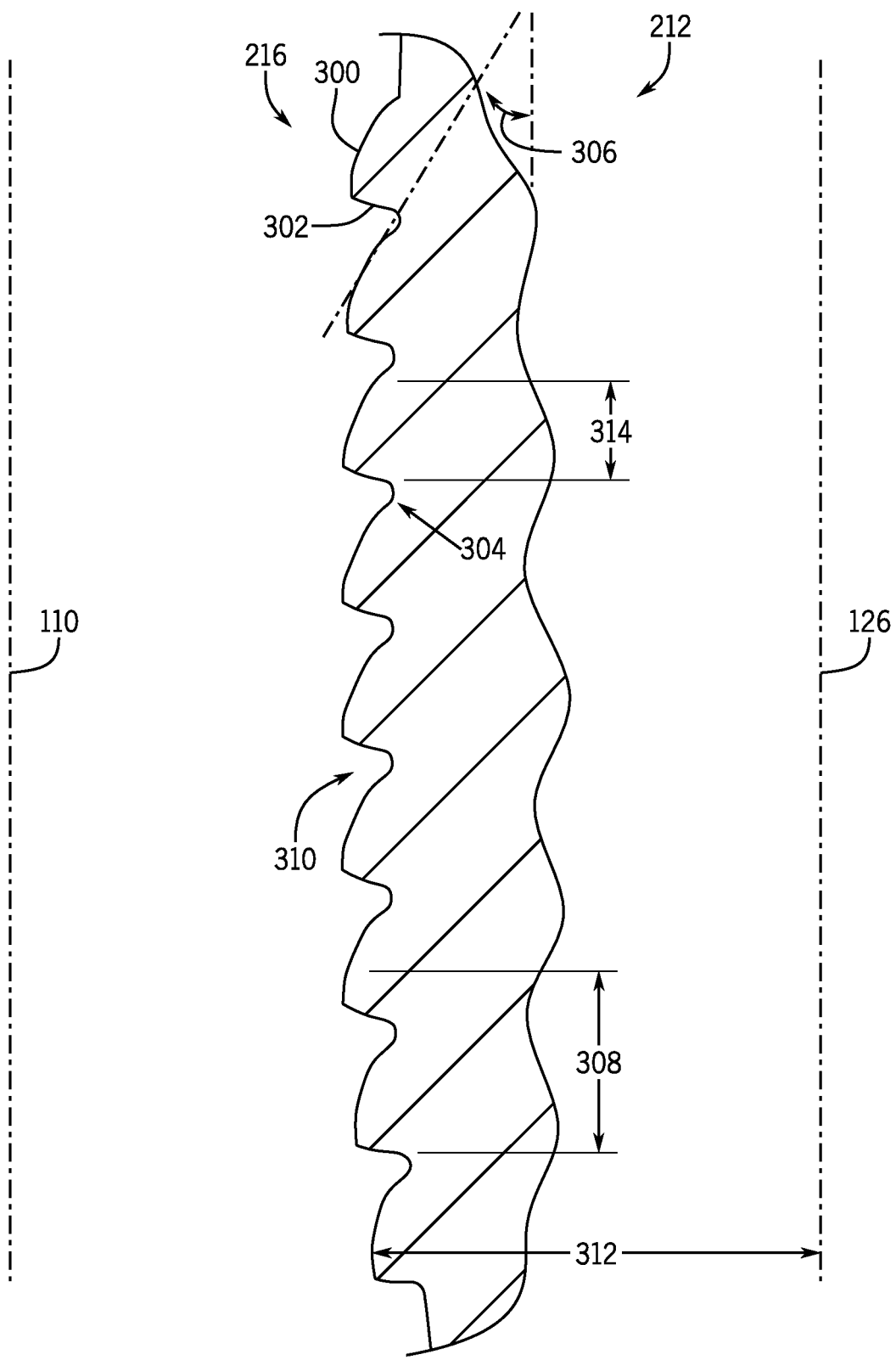
FIG. 3 is a cross-sectional side view of an embodiment of a hanger side profile of a seal, in accordance with embodiments of the present disclosure.

FIG. 3 is a cross-sectional side view of an embodiment of the hanger side profile 212 that forms at least a portion of the seal 116, for example, a radially inward contact surface along the leg 122. As described above, the hanger side profile 212 includes the bumps 216, which extend radially away from the seal axis 126. However, as noted above, the bumps 216 may also be described as the peaks formed by the hanger side groove profile. The illustrated bumps 216 include a first surface 300, which may be considered an upper or uphole surface, and a second surface 302, which may be considered a lower or downhole surface. The first surface 300 in the illustrated embodiment is arcuate or curved. However, it should be appreciated that the curved or arcuate surface is for illustrative purposes only, and in various embodiments the first surface 300 may be sloped or otherwise planar (e.g., without a curve) or any other reasonable shape. Moreover, the second surface 302 may also be sloped in various embodiments and/or arcuate or curved. Additionally, it should be appreciated that the first surface 300 and the second surface 302 need not have the same shape. For example, the first surface 300 may be arcuate while the second surface 302 is sloped. Furthermore, in embodiments, the first surface 300 may be sloped while the second surface 302 is arcuate. The illustrated embodiment includes an undercut 304 arranged between adjacent first and second surfaces 300, 302. The first surface 300 in the illustrated embodiment is substantially arranged at a first angle 306. The first angle 306 may be a tangent line along a portion of the curved surface, for example, a midpoint of the curved surface. It should be appreciated that the first angle 306 may particularly selected based on operating conditions or the like and that changes in the first angle 306 may change how force is distributed within the system. For example, a steeper angle may facilitate greater movement along the hanger profile 206.

The illustrated second surface 302 is arranged axially downhole and coupled to the first surface 300. That is, the combination of the first surface 300 and second surface 302 extend outwardly from the seal 202 to form the bump 216. The second surface 302 is illustrated as substantially flat or planar, however, it should be appreciated that in other embodiments the second surface 302 may be curved, slanted, or the like. As illustrated, the bump 216 is not symmetrical about an axis extending radially through the bump 216. The asymmetrical nature of the bump 216 may facilitate force transfer between components. It should be appreciated that the bump 216 may be symmetrical, as will be described below. Furthermore, in embodiments, it should be appreciated that different portions of the bump 216 may have different dimensions. For example, the upper surface 300 is illustrated as being longer than the lower surface 302, due to the arrangement at the angle 306, however, it should be appreciated that different configurations may be utilized with the present disclosure.

The hanger side profile 212 of the illustrated embodiment includes the plurality of bumps 216. The illustrated number of nine bumps 216 is for example purposes only. In embodiments, the hanger side groove profile 212 may have a number of bumps 216 ranging from 1-15, 1-20, 5-10, 5-15, 5-20, 10-15, 10-20, or 15-20. Furthermore, the hanger side groove profile 212 may have 1, 2, 3, 4, 5, 6, 7, 8, 9, 10, 11, 12, 13, 14, 15, 16, 17, 18, 19, 20 or more bumps 216. It should be appreciated that the hanger side profile 212 may be formulated to include any reasonable number of bumps 216 and the number may be particularly selected due to expected operating conditions. Each of the bumps 216 are positioned a distance away from an adjacent bump 216, which may be referred to as a gap distance 308. The gap distance 308 extends from the respective second surfaces 302 to adjacent respective first surfaces 300. In embodiments, the gap distance 308 is particularly selected based on operations conditions or the like. Moreover, gaps or openings 310 are arranged between the bumps 216. In various embodiments, the gaps 310 may be configured to receive a portion of the hanger profile 206, for example, protrusions, peaks, or edges associated with the grooves 208.

Each of the bumps 216 includes a bump width 312, which corresponds to a radial distance of the bumps 216, and a bump height 314, which corresponds to an axial height of the bumps 216. It should be appreciated that the bump width 312 and the bump height 314 may be particularly selected based on operating conditions, and in embodiments the bumps may be wider than tall, taller than height, as tall as wide, or any other reasonable combination. Moreover, each of the bumps 216 may not have the same dimensions, as some bumps may be wider, taller, or arranged at different angles than the other bumps 216.

As will be described, in embodiments the hanger side profile 212 is driven into the hanger profile 206 to engage the grooves 208 formed along the hanger profile 206. As a downward force is applied to the seal 202, the lower surface 302 may contact a portion of the groove 208. Additionally, an upward force may drive the upper surface 300 into contact with a portion of the groove 208. In this manner, the sealing force (e.g., contact force) generated by the seal 202 may be increased and improve seal quality when acted on by forces in either direction.

Figure 4:
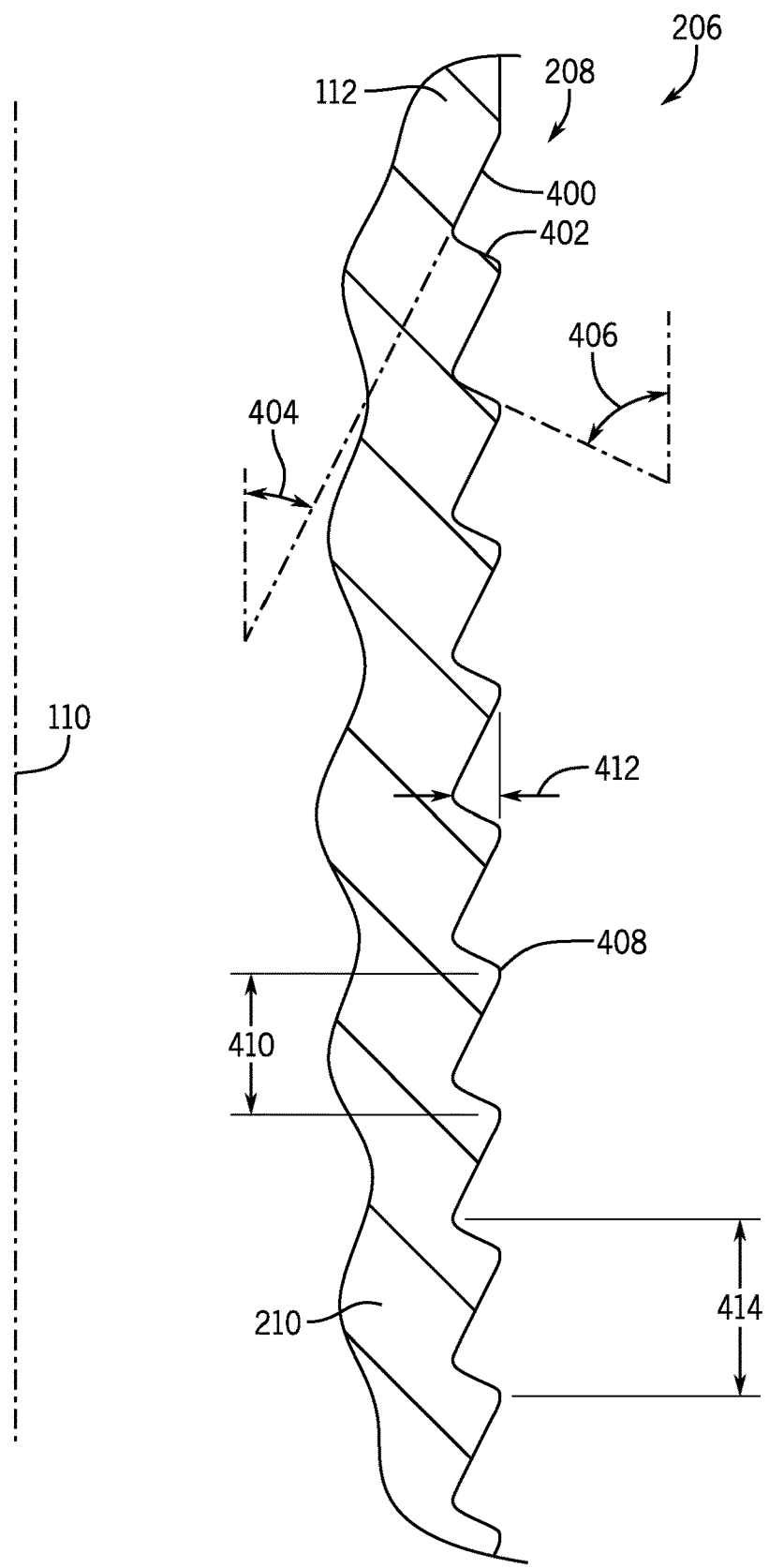
FIG. 4 is a cross-sectional side view of an embodiment of a hanger profile, in accordance with embodiments of the present disclosure.

FIG. 4 is a cross-sectional view of an embodiment of the hanger profile 206 illustrating the grooves 208 formed along an outer surface of the hanger 112. In embodiments, a location of the hanger profile 206 and/or the grooves 208, may be particularly selected based on anticipated interactions with the seal 116, for example, a predetermined distance from the shoulder 114. The illustrated hanger profile 206 includes the plurality of grooves 208 extending radially into the body 210. As noted above, the grooves 208 may be represented by a series of peaks and troughs, with the peaks arranged at a radially outward portion of the hanger 112 and the troughs extending into the body 210. The grooves 208 are asymmetrical in the illustrated embodiment, such that a top groove surface 400 (e.g., uphole groove surface, upstream groove surface, first groove surface) and a bottom groove surface 402 (e.g., downhole groove surface, downstream groove surface, second groove surface) are positioned at different angles. The illustrated top groove surface 400 is arranged at a first groove angle 404 and the bottom groove surface 402 is arranged at second groove angle 406. FIG. 4 illustrates both groove angles 404, 406 as being acute, but it should be appreciated that one or more of the groove angles 404, 406 may be obtuse or a right angle. In operation, the bumps 216 may contact at least one of the surfaces 400, 402 and transmit a force into the hanger 112, such as a force applied from an uphole or downhole pressure. As described, the angle of the surfaces 400, 402 may enable an upward force to at least partially apply a force arranged normal to a contact point between the groove 208 and the bump 216, thereby providing an improved sealing force, even when acted on by downhole pressure.

In the illustrated embodiment, the grooves 208 include a circular or rounded portion 408, which may also be referred to as a peak, but it should be appreciated that other embodiments may include a pointed portion or the like. The shape of the grooves 208, such as a groove height 410 and a groove depth 412, may be particularly selected. The groove height 410 corresponds to an axial height of the groove while the groove depth 412 corresponds to a radial distance of the groove 208 extending into the body 210. As noted above with respect to the dimensions of the bumps 216, the groove height 410 and the groove depth 412 may be particularly selected based on operating conditions. Moreover, each of the grooves 208 may not have the same dimensions, as some grooves may be deeper, taller, or arranged at different angles than the other grooves 208.

The hanger profile 206 of the illustrated embodiment includes the plurality of grooves 208. The illustrated number of ten grooves 208 is for example purposes only. In embodiments, the hanger 206 may have a number of grooves 208 ranging from 1-15, 1-20, 5-10, 5-15, 5-20, 10-15, 10-20, or 15-20. Furthermore, the hanger profile 206 may have 1, 2, 3, 4, 5, 6, 7, 8, 9, 10, 11, 12, 13, 14, 15, 16, 17, 18, 19, 20 or more grooves 208. It should be appreciated that the hanger profile 206 may be formulated to include any reasonable number of grooves 208 and the number may be particularly selected due to expected operating conditions. Each of the grooves 208 is positioned a distance away from an adjacent groove 208, which may be referred to as a groove distance 414. The groove distance 414 extends from the respective bottom surfaces 402 to adjacent respective top surfaces 400. In embodiments, the groove distance 414 is particularly selected based on operations conditions or the like.

Figure 5:
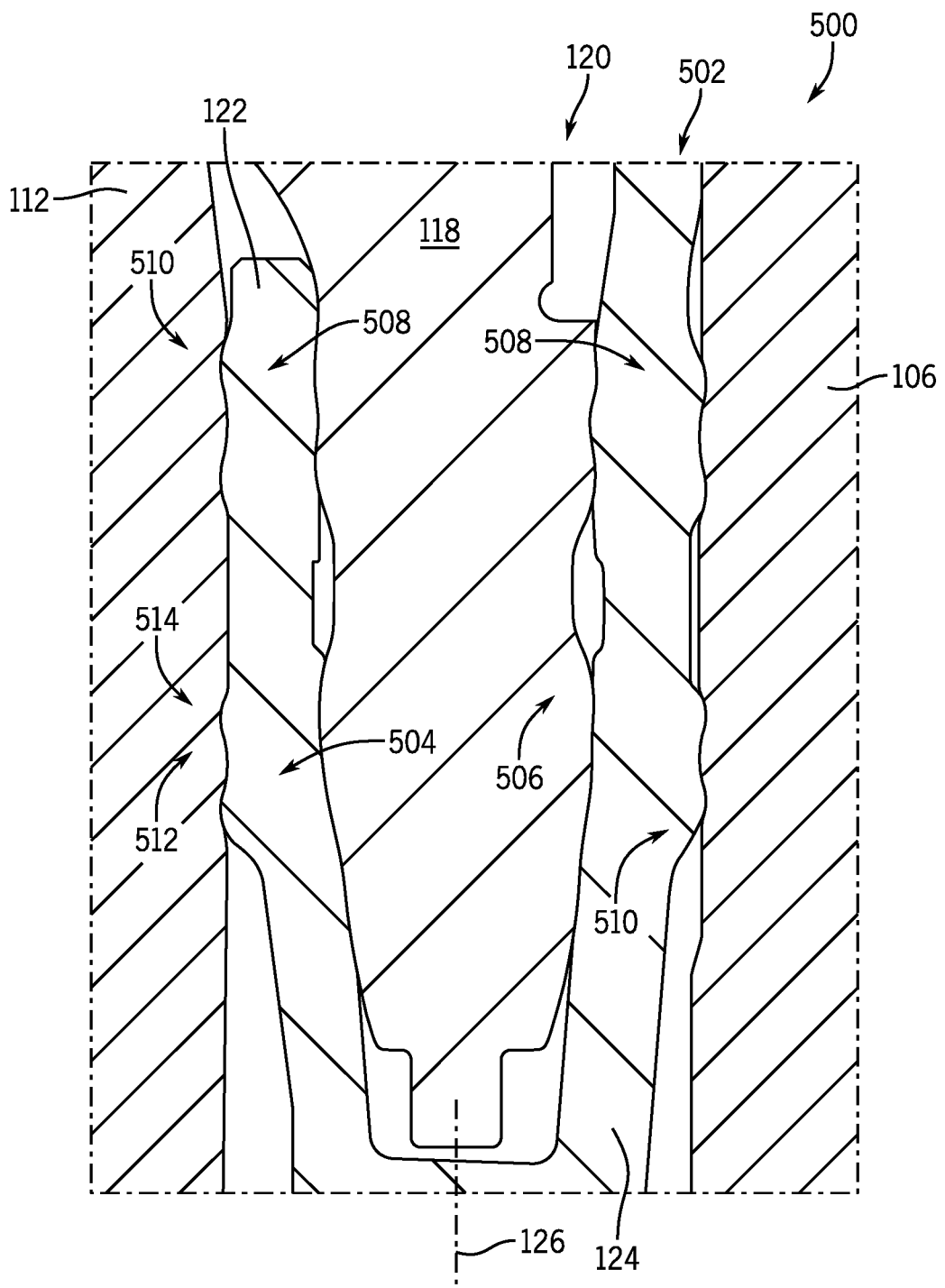
FIG. 5 is a cross-sectional side view of an embodiment of an energized seal arranged in a wellbore, in accordance with embodiments of the present disclosure.

FIG. 5 is a cross-sectional view of an embodiment of a wellbore sealing system 500. In the illustrated embodiment, the energizing ring 118 extends into the opening 120 of a primary seal 502 in order to drive the legs 122, 124 radially outward with respect to the seal axis 126. As described above, the seal 502 includes a hanger side profile 504 and a housing side profile 506, however, it should be appreciated that in various embodiments, at least one of the profiles 504, 506 may be omitted, and moreover, the profiles may not be identical. The illustrated profiles 504, 506 includes a plurality of bumps 508, the bumps 508 being arranged within groups 510 having a pair of bumps 508 in each group. Pairing the bumps 508 is for illustrative purposes and it should be appreciated that the groups 510 may include three bumps 508, four bumps 508, or any reasonable number of bumps 508. The bumps 508 extend radially outward from the seal 502 (e.g., away from the seal axis 126). As described above, the bumps 508 may be part of a grooved profile, where the bumps 508 forms the peaks adjacent to troughs. In operation, the bumps 508 may contact the hanger 112 and/or the housing 106 to form a seal within the wellbore, thereby blocking fluid flow in at least one direction.

The illustrated embodiment includes a hanger profile 512, formed along the hanger 112, that includes grooves 514 that extend radially into the body 210. The illustrated grooves are substantially arcuate, as will be described below, and may be positioned to contact or otherwise interact with the bumps 508 when the seal 502 is positioned within the wellbore, such as on the shoulder 114. In operation, the bumps 508 are driven into contact with the grooves 514 to form a seal within the wellbore. In various embodiments, one or more of the grooves and/or bumps may be asymmetrical in order to facilitate sealing due to pressure from both the uphole and downhole directions. A similar profile is further illustrated on the housing 106, but is being described with reference to the hanger 112 for clarity and conciseness. It should be appreciated that the housing 106 may also be substantially planar or smooth (e.g., not included machined or formed grooves). Advantageously, providing a substantially smooth housing 106 may provide increased flexibility regarding use of the system, as the alignment of the components will rely on the seal and the hanger, and not the seal, housing, and hanger.

Figure 6:
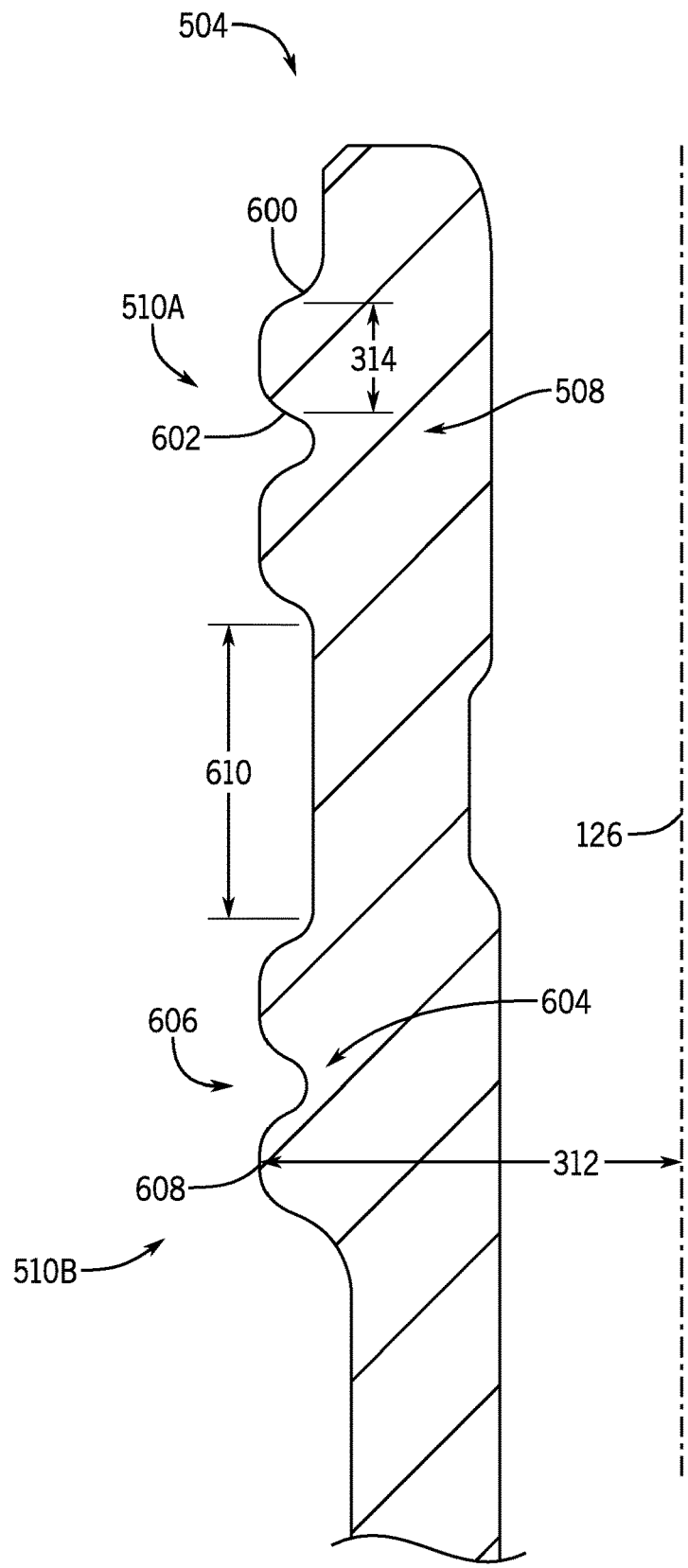
FIG. 6 is a cross-sectional side view of an embodiment of a hanger side profile of a seal, in accordance with embodiments of the present disclosure.

FIG. 6 is a cross-sectional view of an embodiment of the hanger side profile 504 illustrating the groups 510 of bumps 508. In the illustrated embodiment, a first group 510A includes a pair of bumps 508 and a second group 510B includes a second pair of bumps 508. It should be appreciated that there may be more groups and also more bumps per group. The bumps shown in FIG. 6 are substantially arcuate with a top surface 600 (e.g., uphole surface, upstream surface, first surface) and a bottom surface 602 (e.g., downhole surface, downstream surface, second surface). It should be appreciated that the arcuate shapes of the top surface 600 and bottom surface 602 are for illustrative purposes and that the surfaces 600, 602 may also be substantially planar or sloped and may further include with a peak or cap. Additionally, as noted above, one of the surfaces 600, 602 may be arcuate while the other surface 600, 602 is planar. The top surface 600 in the illustrated embodiment extends from a trough 604 of a gap 606 to a peak 608 of the bump 508 and is arranged on the upstream side of the bump 508. The bottom surface 602 extends from the peak 608 to the trough 604 and is arranged on the downstream side of the bump 508. In various embodiments, the bumps 508 may be substantially symmetrical, however, in other embodiments the bumps 508 may be asymmetrical. The illustrated bumps 508 further include the bump width 312 and the bump height 314, described above. It should be appreciated that each bump 508 may not be the same size and that sizes of bumps may be different for each group or each bump, for example. In the illustrated embodiment, the groups 510A, 510B are separated by an axial distance 610. The axial distance 610 may be particularly selected based on various operating parameters. Moreover, as noted above, the number of bumps and/or groups may be particularly selected and the illustrated four bumps 508 and two groups 510 is for illustrative purposes.

Figure 7:
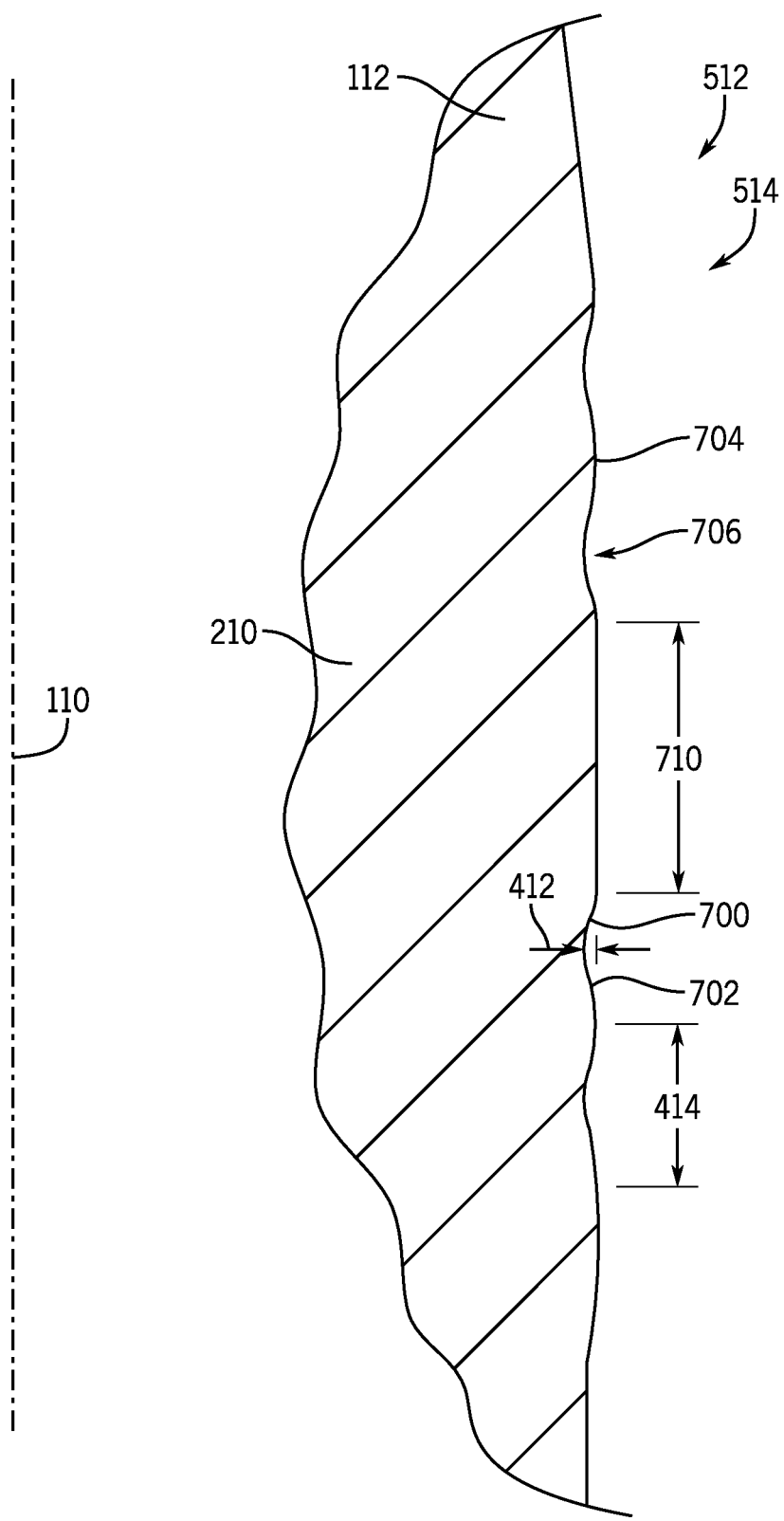
FIG. 7 is a cross-sectional side view of an embodiment of a hanger profile, in accordance with embodiments of the present disclosure.

FIG. 7 is a cross-sectional view of an embodiment of the hanger profile 512 illustrating the grooves 514 formed along an outer surface of the hanger 112. In embodiments, a location of the hanger profile 512 and/or the grooves 514, may be particularly selected based on anticipated interactions with the seal 116, for example, a predetermined distance from the shoulder 114. The illustrated hanger profile 512 includes the plurality of grooves 514 extending radially into the body 210. The grooves 514 are arcuate in the illustrated embodiment, having a top groove surface 700 (e.g., upstream groove surface, uphole groove surface, first groove surface) and a bottom groove surface 702 (e.g., downstream groove surface, downhole groove surface, second groove surface). The top groove surface 700 is arranged on the uphole side of the groove 514 and extends from an adjacent peak 704 to a trough 706. Similarly, the bottom groove surface 702 is arranged on the downhole side of the groove 514 and extends from the trough 706 to an adjacent peak 704.

The illustrated grooves 514 are arranged as pairs in groove groups 708, but it should be appreciated that more grooves 514 may be included within the groove groups 708. The groove groups 708 are further separated by an axial distance 710, which may substantially correspond to the axial distance 610 to enable the grooves 514 to align with the bumps 508. The illustrated groove groups 708 have a substantially sinusoidal pattern, but it should be appreciated that different patterns or forms may be utilized. For example, the top groove surface 700 and the bottom groove surface 702 may be formed from arcs with different radii. In other words, the grooves 514 may not be symmetrical about the trough 706.

The shape of the grooves 514, such as the groove height 410 and the groove depth 412, may be particularly selected. The groove height 410 corresponds to an axial height of the groove while the groove depth 412 corresponds to a radial distance of the groove 514 extending into the body 210. As noted above with respect to the dimensions of the bumps 508, the groove height 410 and the groove depth 412 may be particularly selected based on operating conditions. Moreover, each of the grooves 514 may not have the same dimensions, as some grooves may be deeper, taller, or arranged at different angles than the other grooves 514. Moreover, as noted above, the number of grooves and/or groove pairs may be particularly selected and the illustrated four grooves 514 and two groove pairs is for illustrative purposes.

Figure 8:
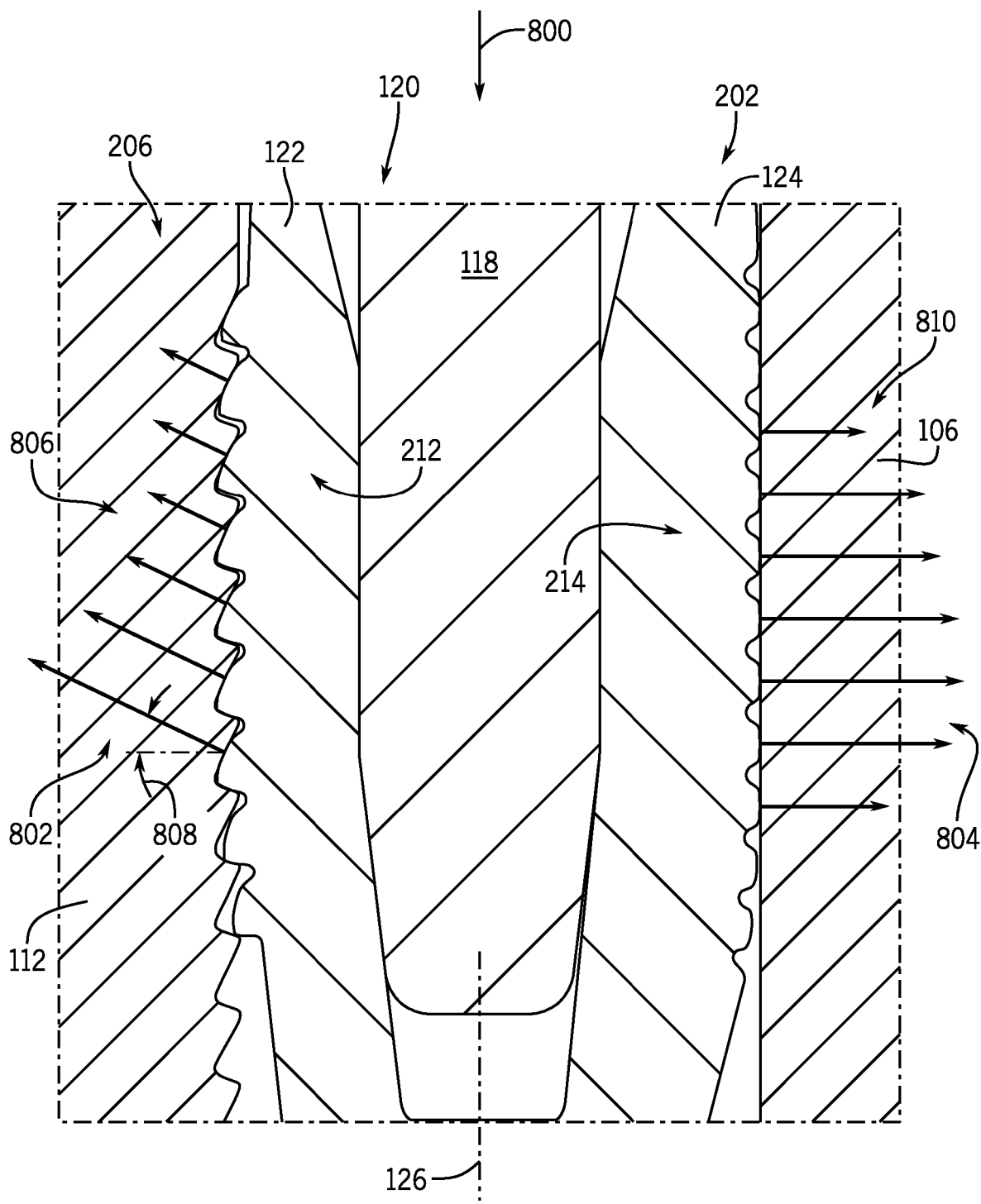
FIG. 8 is a cross-sectional side view of an embodiment of an opening of a seal receiving an energizing ring, in accordance with embodiments of the present disclosure.

FIGS. 8-11 are cross-sectional views representing installation and operation of the energizing ring 118 within the seal 202 to drive the legs 122, 124 radially outward from the seal axis 126. FIG. 8 illustrates the energizing ring 118 positioned within the opening 120, driving the hanger side profile 212 into engagement with the hanger profile 206 and the housing side profile 214 toward the housing 106. The downward force is illustrated by the arrow 800 and may be provided by a setting tool or the like, which is utilized to deform the seal 202 via the energizing ring 118.

FIG. 8 further illustrates a hanger side force profile 802 and a housing side force profile 804. For example, the housing side force profile 802 includes groove force indicators 806, represented by arrows, which are illustrative of a general direction of the force vector resulting from the downward force 800. The illustrated force indicators 806 are arranged at an angle 808, illustrating that the outward force applied by the energizing ring 118 is driving the leg 122 generally normal to the seal axis 126. In other words, a sealing radial force is being applied, which may include some axial force components. For example, the force is translated along the sloped surfaces of the hanger profile 206, and as a result, the force vector may include both an axial component and a radial component. The housing side force profile 804 is illustrated with force indicators 810 that are substantially normal to the seal axis 126. In various embodiments, the energizing ring 118 deforms or otherwise drives the legs 122, 124 radially outward from the seal axis 126, and as a result, the energizing ring 118 is arranged at a first location 812 within the opening 120.

In the embodiment illustrated in FIG. 8, the setting force 800 will drive the lower bump surfaces 302 against the bottom groove surfaces 402 and also drive the upper bump surfaces 300 against the top groove surfaces 400, due to the radial movement of the legs 122, 124. Advantageously, this contact force may enable seal formation within the wellbore environment.

Figure 9:
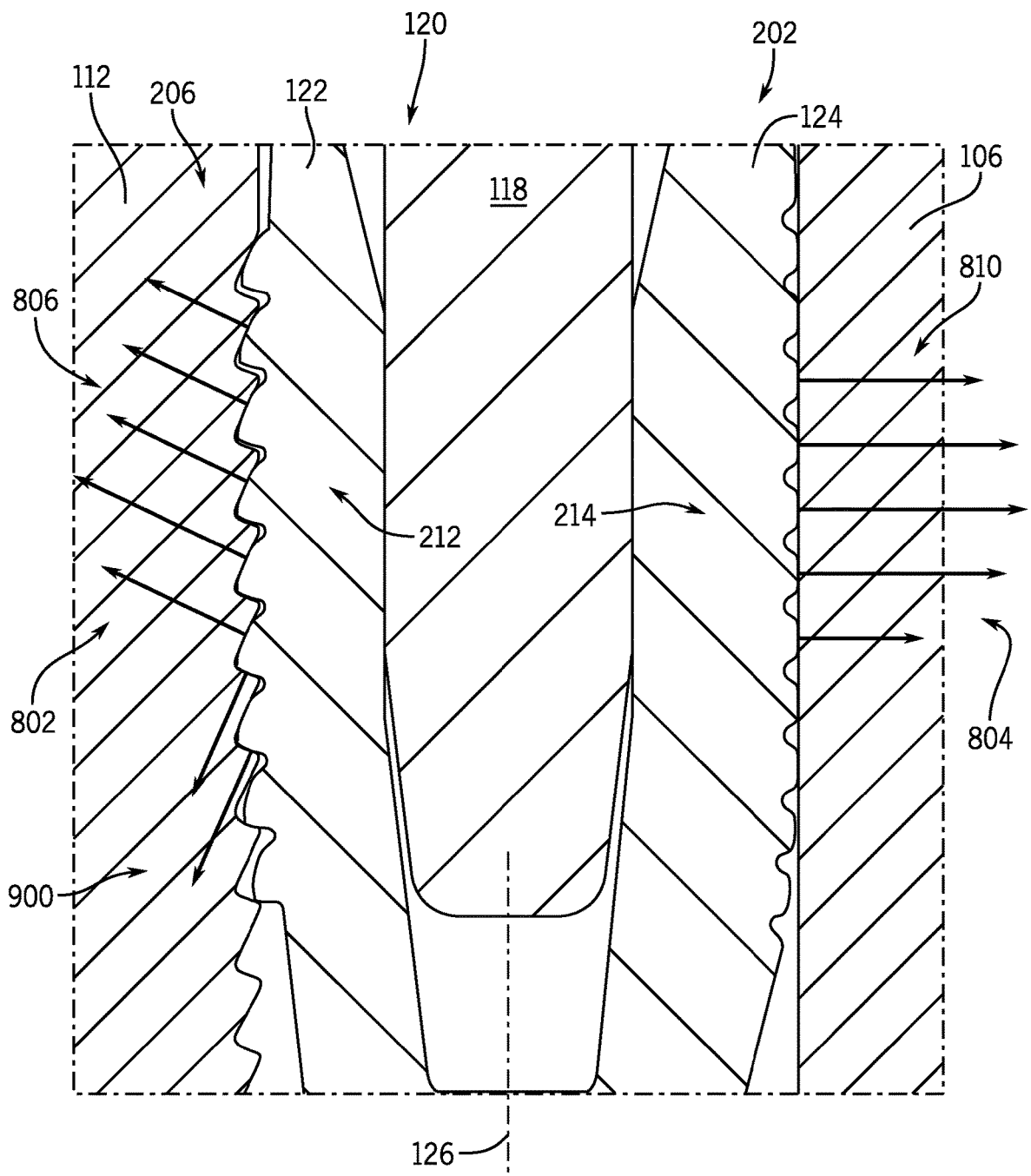
FIG. 9 is a cross-sectional side view of an embodiment an energized seal, in accordance with embodiments of the present disclosure.

FIG. 9 illustrates a spring back position of the seal 202 where the energizing ring 118 is moved axially upward to a second location 900. In the illustrated embodiment, the respective force profiles 802, 804 and force indicators 806, 810 are substantially similar as those illustrated in FIG. 8. The energizing ring 118 continues to drive the legs 122, 124 radially outward from the seal axis 126, even if some flexing has occurred to axially move the energizing ring 118.

Figure 10:
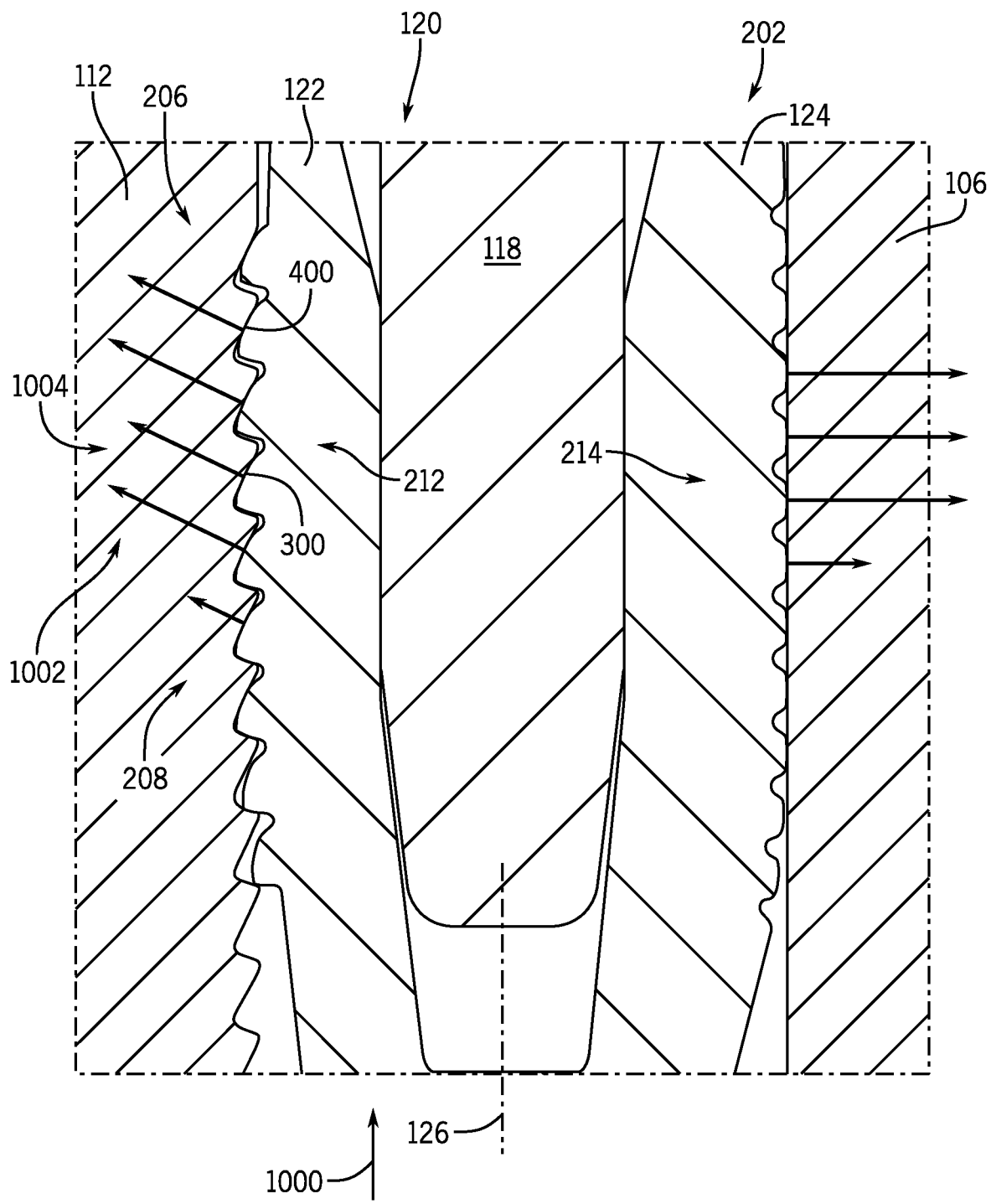
FIG. 10 is a cross-sectional side view of an embodiment of an energized seal subjected to a downhole pressure, in accordance with embodiments of the present disclosure.

FIG. 10 illustrates the seal 202 when subjected to a force from below, represented by the arrow 1000. The force from below may be a downhole pressure. As noted above, typically, the seal 202 may tend to collapse or lose sealing force due to the force 1000. However, embodiments of the present disclosure may include the asymmetrical grooves 208 formed in the hanger 112. As a result, respective upper surfaces 300 of the bumps 216 are driven into the respective top groove surfaces 400. Because the top groove surfaces 400 are arranged at an angle, at least a portion of the force is redirected in a radial direction, as illustrated by the force profile 1002 and associated groove force indicators 1004. As a result, sealing pressure is increased and/or maintained, thereby maintaining the integrity of the seal. As pressure increases, the force also increases, which leads to an effective seal due to the increased contact force. In this manner, embodiments of the present disclosure may be utilized to reduce collapse of the seal 202.

In various embodiments, the bumps 216 may be prevented from jumping between grooves 208 of the hanger profile 206 during setting and/or after the seal 202 is set. For example, as the upper surface 300 travels along the top groove surface 400, the respective angles may be particularly selected to prevent the upper surface 300 from disengaging and moving to an adjacent groove 208. However, in embodiments, movement may be enabled by selecting various different dimensions.

Figure 11:
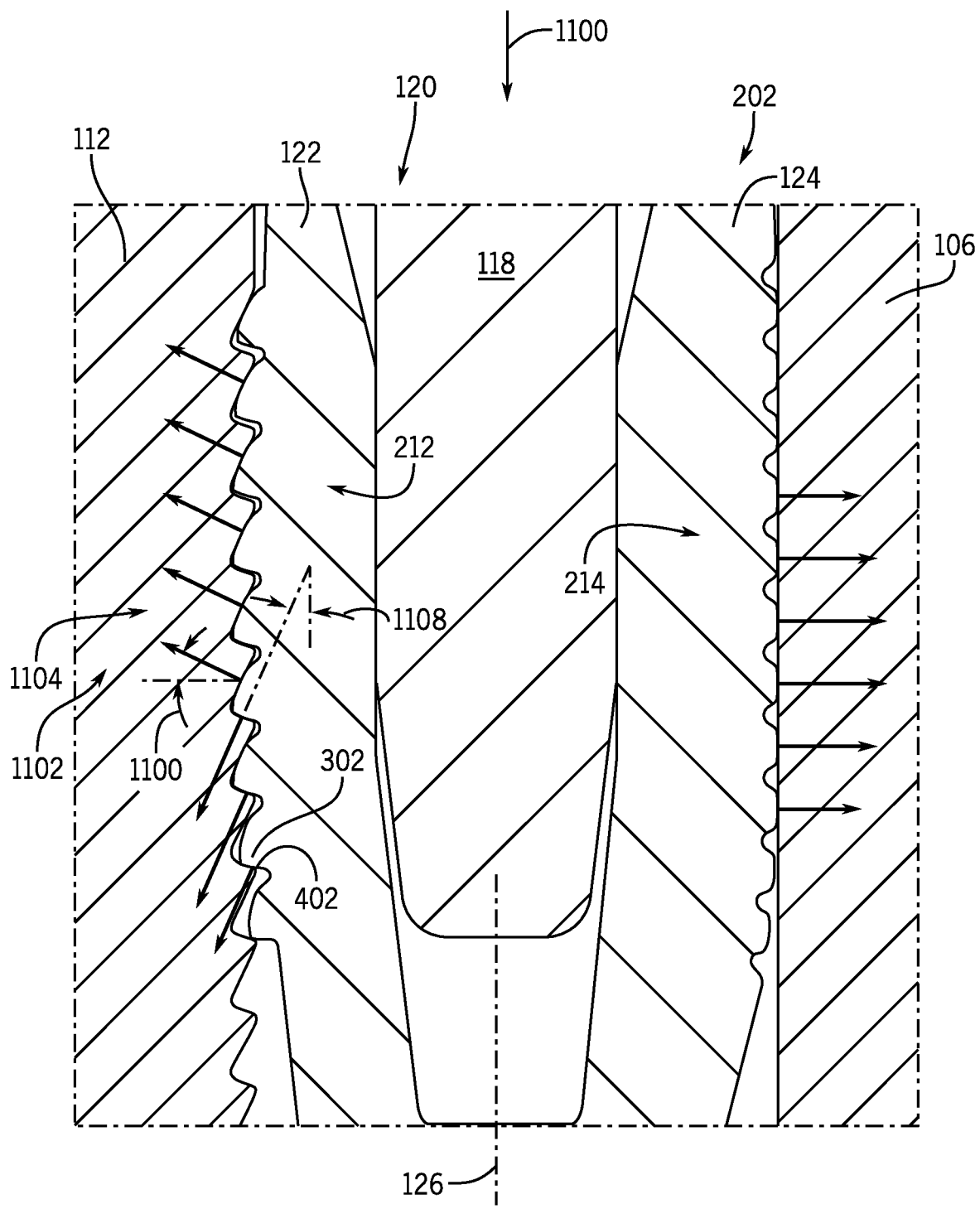
FIG. 11 is a cross-sectional side view of an embodiment of an energized seal subjected to an uphole pressure, in accordance with embodiments of the present disclosure.

FIG. 11 illustrates the seal 202 when subjected to a force from above, represented by the arrow 1100. The force from above may be a pressure test force, among other potential sources. The force 1100 from above drives respective lower surfaces 302 of the bumps into respective bottom groove surfaces 402. Moreover, the force 1100 drives the energizing ring 118 into the opening 120, which may be translated into a radial force applied to the hanger 112 via the leg 122. For example, the illustrated force profile 1102 includes force indicators 1104, which may be arranged at first and second angles 1106, 1108. Each of the force indicators 1104 includes some radial component, which provides for effective sealing using the seal 202. As a result, embodiments of the present disclosure enable sealing when subject to both uphole pressures and downhole pressures.

The force 1100, which is the result of pressure from an uphole location, may act on the walls 122, 124 by driving the energizing ring 118 in a downward direction and/or due to direct pressure contact with the walls 122, 124. This downward force drives the walls 122, 124 radially outward, respectively, from the axis 126. The result of the force 1100 is a radial force that increases contact at the interfaces with the hanger 112 and the housing 106. This increased radial contact force resulting from the uphole pressure is expected, however, the same cannot be said for downhole pressures that act in the uphole direction, as described herein. As noted above, downhole pressures apply forces to the outside of the seal 202. Embodiments of the present disclosure, as a result, may benefit from both uphole and downhole forces. That is, the uphole pressures illustrated in FIG. 11 may drive the arms 122, 124 radially outward and downhole forces, as described above, utilize axial lift on the shallow tapers to provide a radial force at the hanger 112 and the housing 106 that may improve sealing characteristics of the system.

Figure 12:
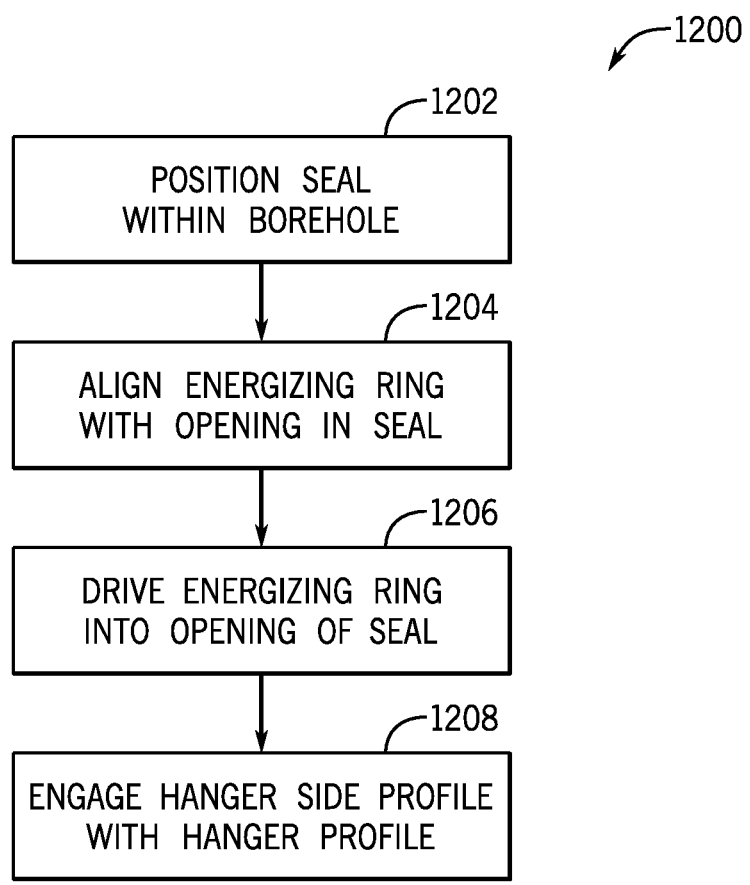
FIG. 12 is a flow chart of an embodiment of a method for installing a seal, in accordance with embodiments of the present disclosure.

FIG. 12 is a flow chart of an embodiment of a method 1200 for setting a pressure energized seal. It should be appreciated for this method, and any methods described herein, that the steps may be performed in any order or in parallel, unless otherwise specifically stated. Moreover, the method 1200 may include more, fewer, or alternative steps. In this example, a seal is arranged within a borehole 1202. For example, in various embodiments the seal is landed on a shoulder of a hanger. The seal may be positioned at a particularly selected location, such as proximate a hanger profile. An energizing ring is aligned with an opening in the seal 1204. For example, both the seal and energizing ring may be annular components and the seal may be a U-shaped seal that is sized to receive the energizing ring. The energizing ring may be aligned with an axis of the seal. The energizing ring is driven into the opening of the seal 1206. Driving the energizing ring into the opening may deform or otherwise modify the seal such that legs of the seal are driven radially away from the seal axis. The energizing ring may have a width that is larger than a seal opening width such that installation within the seal opening deforms the seal. Movement of the legs may be radially away from the seal axis such that the hanger side profile of the seal engages the hanger profile formed in the hanger. For example, bumps formed on the seal may engage grooves formed in the hanger. The bumps may transmit a radial sealing force to the hanger, thereby forming a wellbore seal.

The foregoing disclosure and description of the disclosed embodiments is illustrative and explanatory of various embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for forming a seal between wellbore components, comprising:

an annular seal arranged between a first wellbore component and a second wellbore component, the seal comprising a first leg and a second leg, the first leg positioned proximate the first wellbore component and the second leg positioned proximate the second wellbore component, wherein upon activation of the seal, the first leg engages the first wellbore component and the second leg engages the second wellbore component; and an energizing ring adapted to activate the seal, the energizing ring extending into an opening of the seal to drive the first leg and the second leg radially outward relative to an axis of the seal, wherein the first wellbore component includes a groove profile, the groove profile having a plurality of grooves including respective first surfaces and second surfaces, the respective first surfaces arranged at respective first angles and the respective second surface arranged at respective second angles, the respective first and second angles being different to form respective asymmetrical grooves to permit relative motion of the first leg absent a penetrating engagement between the first leg and the first wellbore component at a sealing interface formed between the first leg and the asymmetrical grooves of the first wellbore component.

2. The system of claim 1, wherein at least one of the respective first angles and second angles are acute.

3. The system of claim 1, wherein the first angle is greater than the second angle, the first angle directing at least a portion of a force applied by the first leg in a radial direction.

4. The system of claim 1, wherein the first leg includes a second groove profile, the second groove profile having a plurality of bumps including respective first bump surfaces and second bump surfaces, the first bump surface arranged at a first bump angle and the second bump surface arranged at a second angle, the first bump angle and the second bump angle being different, and wherein a first pitch of the plurality of bumps is different from a second pitch of the plurality of grooves.

5. The system of claim 4, wherein the respective first bump surfaces are substantially arcuate and the second bump surfaces are substantially flat.

6. The system of claim 4, wherein the grooves of the plurality of grooves are grouped into groove groups and bumps of the plurality of bumps are grouped into bump groups, the respective groove groups and bump groups being separated from adjacent groove groups and bump groups.

7. The system of claim 1, wherein the first angle is less than the second angle.

8. The system of claim 1, wherein at least a portion of the respective first groove surfaces are engaged when the seal is subjected to a downhole pressure corresponding to a force applied in an upward direction, the respective first groove surfaces translating at least a portion of the force into a radial force.

9. The system of claim 8, wherein a contact force between the seal and the first wellbore component increases when the downhole pressure acts on the seal.

10. A downhole sealing system, comprising:
a U-shaped seal having a first leg and a second leg, the first leg being a hanger side leg having a hanger side profile, comprising:
 a bump formed by at least a portion of a peak positioned proximate a pair of troughs, the bump having a first bump surface and a second bump surface, the first bump surface arranged in an uphole direction and the second bump surface arranged in a downhole direction; and
a hanger adapted to be positioned proximate the first leg of the U-shaped seal, the hanger having a hanger profile, comprising:
 a groove having a first groove surface and a second groove surface, the first groove surface arranged at a first angle in the downhole direction and the second groove surface arranged the at a second angle in the upstream direction, the first and second angles being different to form an asymmetrical groove;
wherein the bump is positioned to engage the groove to form a sealing interface between the U-shaped seal and the hanger when the first leg is driven toward the hanger such that the bump does not penetrate the hanger, and each of the first groove surface and the second groove surface are engaged by the bump.

11. The downhole sealing system of claim 10, further comprising:
a plurality of bumps forming the hanger side profile; and
a plurality of grooves forming the hanger profile;
wherein respective bumps of the plurality of bumps are positioned to engage respective grooves of the plurality of grooves when the first leg is driven toward the hanger.

12. The downhole sealing system of claim 10, wherein at least one of the respective first angles and second angles are acute.

13. The downhole sealing system of claim 10, wherein the first angle is greater than the second angle, the first angle directing at least a portion of a force applied by the first leg in a radial direction.

14. The downhole sealing system of claim 10, wherein the first bump surface is arranged at a first bump angle and the second bump surface is arranged the at a second bump angle, the first and second bump angles being different.

15. The downhole sealing system of claim 10, wherein the first bump surface is substantially arcuate and the second bump surface is substantially flat.

16. The downhole sealing system of claim 10, wherein the first groove surface is engaged, by the first bump surface, the when the seal is subjected to a downhole force.

17. The downhole sealing system of claim 11, wherein the first groove surface is engaged, by the first bump surface, and the second groove surface is engaged, by the second bump surface, the when the seal is subjected to an uphole force.

18. A method for forming a downhole seal, comprising:
arranging a seal within a wellbore between a first wellbore component and a second wellbore component;
aligning an energizing ring with an opening of the seal;
driving the energizing ring into the opening of the seal to deform the seal, the deformation driving a first leg of the seal toward the first wellbore component and a second leg of the seal toward the second wellbore component; and
engaging, to form a sealing interface, an asymmetrical groove formed in the first wellbore component via a profile of the first leg so that the profile can move relative to the asymmetric groove without penetrating the first wellbore component.

19. The method of claim 18, further comprising:
engaging a first surface of the asymmetrical groove via a first profile surface of the first leg when the seal is subject to a downhole force.

20. The method of claim 18, further comprising:
engaging a first surface of the asymmetrical groove via a first profile surface of the first leg when the seal is subject to an uphole force; and
engaging a second surface of the asymmetrical groove via a second profile surface of the first leg when the seal is subject to the uphole force.

* * * * *